United States Patent [19]
Kojima et al.

[11] Patent Number: 6,032,937
[45] Date of Patent: Mar. 7, 2000

[54] VIBRATION ISOLATING APPARATUS

[75] Inventors: Hiroshi Kojima; Kosuke Toba, both of Yokohama, Japan

[73] Assignee: Bridgestone Corporation, Tokyo, Japan

[21] Appl. No.: 08/996,220

[22] Filed: Dec. 22, 1997

[30] Foreign Application Priority Data

Dec. 27, 1996 [JP] Japan ................................ 8-351589

[51] Int. Cl.⁷ ....................................................... F16F 5/00
[52] U.S. Cl. ................................... 267/140.14; 267/140.13
[58] Field of Search ........................... 267/140.14, 140.13

[56] References Cited

U.S. PATENT DOCUMENTS

| | | | |
|---|---|---|---|
| 5,249,782 | 10/1993 | Ide et al. ............................... | 267/140.14 |
| 5,277,409 | 1/1994 | Goto et al. ............................ | 267/140.14 |
| 5,718,417 | 2/1998 | Aoki ..................................... | 267/140.14 |

FOREIGN PATENT DOCUMENTS

| | | |
|---|---|---|
| 5-272574 | 10/1993 | Japan . |
| 5-312232 | 11/1993 | Japan . |
| 7-269645 | 10/1995 | Japan . |
| 9-257092 | 9/1997 | Japan . |

*Primary Examiner*—Mark T. Le
*Assistant Examiner*—Mariano Sy
*Attorney, Agent, or Firm*—Oliff & Berridge, PLC

[57] ABSTRACT

The present invention is a vibration isolating apparatus, comprising: an elastic body which is connected to one of a vibration generating portion and a vibration receiving portion and which is elastically deformed when vibration is inputted; a liquid chamber forming member which forms a liquid chamber with the elastic body; a movable plate which forms a portion of a partitioning wall of the liquid chamber and which controls the pressure of the liquid chamber; an actuator which drives the movable plate; an elastic film which is disposed between the movable plate and the liquid chamber forming member so as to seal the liquid chamber; a plate spring which is disposed on the elastic film at one of the liquid chamber side and the side opposite the liquid chamber side and which elastically supports the movable plate with respect to the liquid chamber forming member, the plate spring opposing the elastic film so that the plate spring is able to contact the elastic film; and a restricting member which is disposed on the elastic film at the side opposite the side at which the plate spring is provided, wherein swelling and deformation of the elastic film at the liquid chamber side and at the side opposite the liquid chamber side is prevented by the plate spring and the restricting member.

20 Claims, 3 Drawing Sheets

VIBRATION ISOLATING APPARATUS

BACKGROUND OF THE INVENTION

1. Field of the Invention

The invention relates to a liquid-filled type vibration isolating apparatus, and in particular, to a vibration isolating apparatus in which the characteristic of isolating vibration is improved by controlling the internal pressure of a liquid chamber.

2. Description of the Related Art

An automobile engine is supported to a vehicle body via a vibration isolating apparatus. The vibration of the engine is prevented from being transmitted to the vehicle body.

Such vibration isolating apparatus includes a liquid-filled type vibration isolating apparatus in which a liquid chamber is provided within the apparatus and vibration is effectively absorbed at the time of input of vibration by controlling the internal pressure of the liquid chamber.

In the liquid-filled type vibration isolating apparatus, a movable plate, which can be moved by an actuator such as an electromagnet, is provided at a partitioning member which faces the pressure-receiving liquid chamber. The internal pressure of the pressure-receiving liquid chamber is controlled by vibrating the movable plate in accordance with the input of vibration.

The movable plate is resiliently supported by an elastic body such as a metallic spring, rubber, and the like. In a system in which the movable plate is supported by the metallic spring, a partitioning member is formed of a thin metallic plate and the partitioning member itself serves as the metallic spring and supports the movable plate. Further, the movable plate and the partitioning member are adherently fixed so as to prevent the leakage of the liquid.

On the other hand, in a system in which the movable plate is supported by the rubber, an annular rubber is connected to the outer periphery of the movable plate and the outer periphery of the rubber is connected to the partitioning member.

However, in the system in which the movable plate is supported by the rubber, the length of the rubber in the direction orthogonal to the displacing direction of the movable plate is short, and the spring constant of the rubber in the displacing direction of the movable plate is as relatively high as that of a metallic spring. As a result, distortion of the rubber at the time of control becomes large and durability of the rubber deteriorates.

Moreover, in the system in which the metallic spring serves as the partitioning member and supports the movable plate, the stress applied to the partitioning member is concentrated on a stationary portion thereof at the time of control and cracking may occur at the partitioning member.

SUMMARY OF THE INVENTION

With the aforementioned in view, an object of the invention is to provide a vibration isolating apparatus which has excellent durability.

A first aspect of the invention is a vibration isolating apparatus, comprising: an elastic body which is connected to one of a vibration generating portion and a vibration receiving portion and which is elastically deformed when vibration is inputted; a liquid chamber forming member which forms a liquid chamber with the elastic body; a movable plate which forms a portion of a partitioning wall of the liquid chamber and which controls the pressure of the liquid chamber; an actuator which drives the movable plate; an elastic film which is disposed between the movable plate and the liquid chamber forming member so as to seal the liquid chamber; a plate spring which is disposed on the elastic film at one of the liquid chamber side and the side opposite the liquid chamber side and which elastically supports the movable plate with respect to said liquid chamber forming member, the plate spring opposing the elastic film so that the plate spring is able to contact the elastic film; and a restricting member which is disposed on the elastic film at the side opposite the side at which the plate spring is provided, wherein swelling and deformation of the elastic film at the liquid chamber side and at the side opposite the liquid chamber side is prevented by the plate spring and the restricting member.

In accordance with the first aspect of the invention, the internal pressure of the liquid chamber can be controlled as the movable plate which forms a portion of the partitioning wall is driven by the actuator. In this way, the vibration isolating characteristic of the vibration isolating apparatus can be controlled.

Further, it is not necessary that the elastic film supports the movable plate and it suffices if the elastic film seals the liquid chamber. As a result, the length of the portion at which the elastic film moves is made long, distortion of the elastic body can be reduced, and durability thereof can be improved. Moreover, because swelling and deformation of the elastic film due to the liquid pressure of the liquid chamber is restricted by the plate spring and the restricting member, swelling of the elastic film and escape of pressure from the liquid chamber can be prevented. The internal pressure of the liquid chamber can be controlled reliably. Furthermore, a superior effect is achieved in that durability of the elastic film can be improved.

A second aspect of the invention is a vibration isolating apparatus according to the first aspect, wherein the plate spring is supported as the ends of the plate spring are free ends.

In the vibration isolating apparatus of the second aspect, the plate spring is supported as the ends of the plate spring are free ends. Accordingly, compared to the apparatus in which the plate spring is fixed and supported, stress generated at the inner side of the plate spring can be reduced and durability of the plate spring can be improved.

DESCRIPTION OF THE PREFERRED EMBODIMENTS

A vibration isolating apparatus relating to an embodiment of the invention will be explained in accordance with FIGS. 1 through 3.

Figure 1:
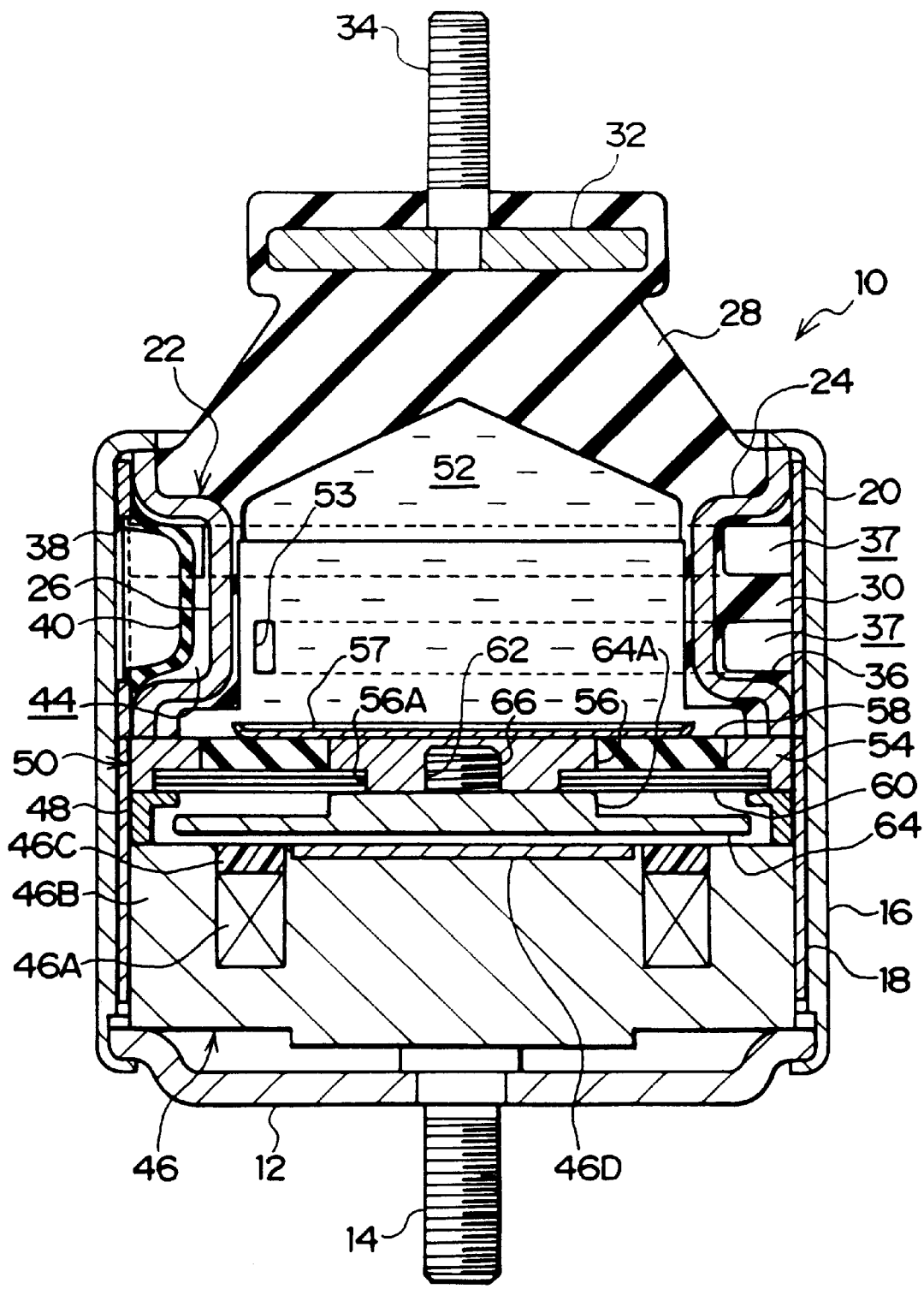
FIG. 1 is a cross-sectional view of a vibration isolating apparatus relating to an embodiment of the present invention.

As shown in FIG. 1, a disk-shaped lower mount 12 is provided at the lower portion of a vibration isolating apparatus 10.

A mounting bolt 14 is provided at the center of the lower mount 12. The lower mount 12 is disposed on, for example, the vehicle body of an unillustrated automobile and is fixed to the vehicle body as a nut is screwed to the mounting bolt 14.

The lower end portion of an outer cylinder 16 is fixed by caulking to the outer peripheral portion of the lower mount 12. A first intermediate cylinder 18 and a second intermediate cylinder 20 are inserted into the outer cylinder 16.

Figure 2:
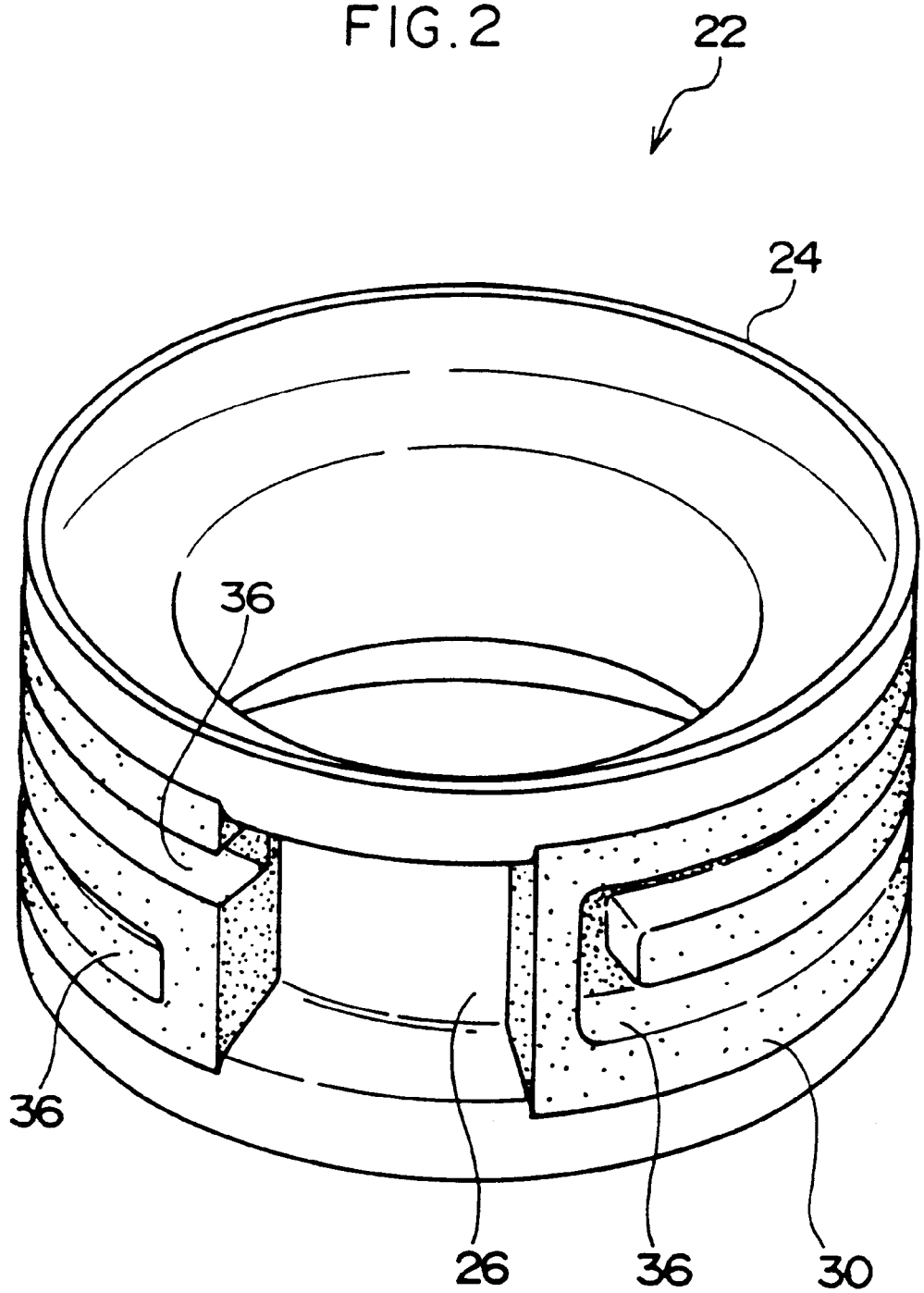
FIG. 2 is a perspective view of a rubber molded product.
Figure 3:
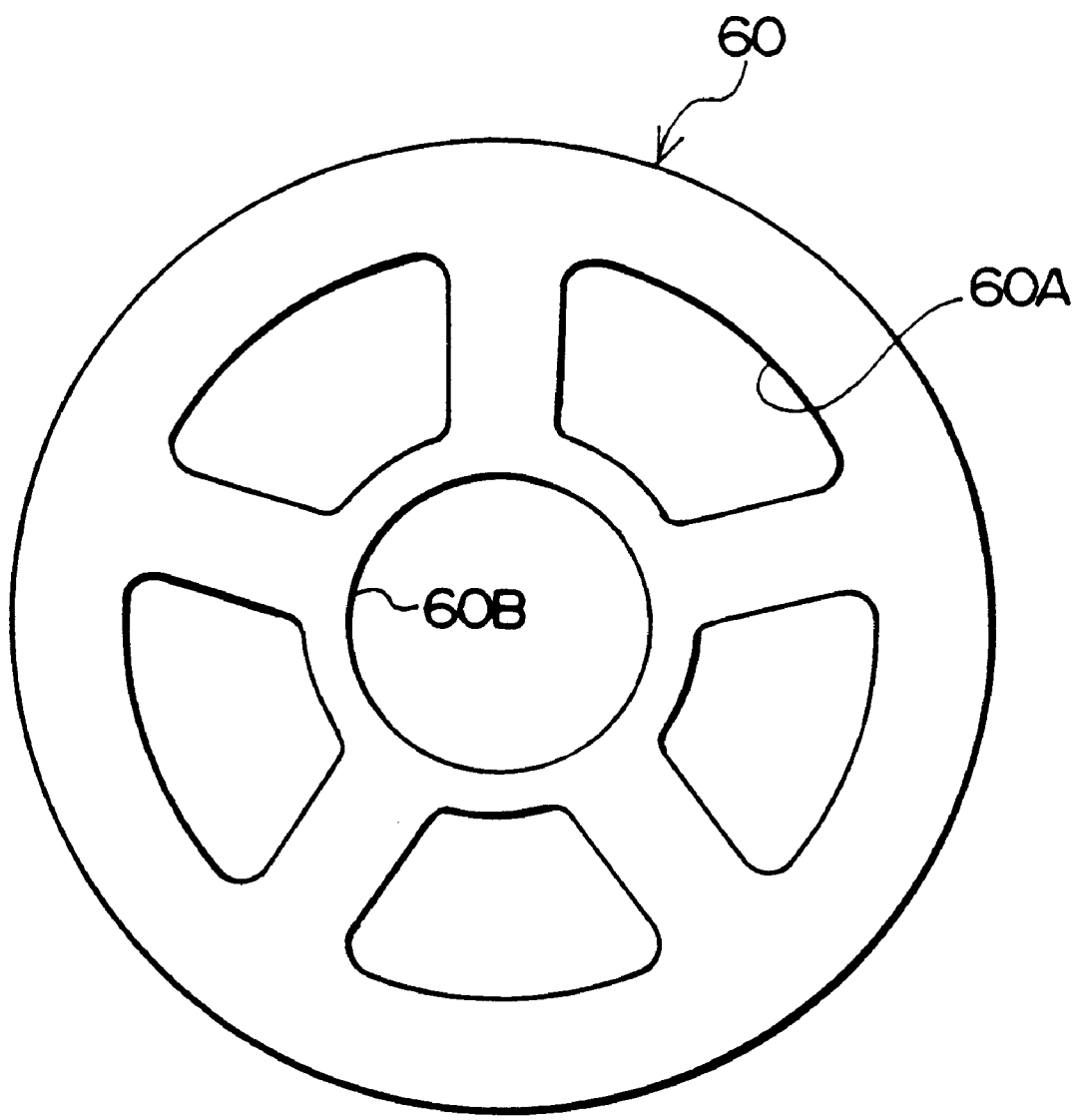
FIG. 3 is a plan view of a plate spring.

A rubber molded product 22 shown in FIG. 2 is inserted into the second intermediate cylinder 20. As shown in FIGS. 1 and 2, the rubber molded product 22 has a cylindrical metal fitting 24. An annular groove 26 is formed at the axial direction intermediate portion of the cylindrical metal fitting 24.

As shown in FIG. 1, a vibration absorbing main body 28, which is formed of a thick rubber, is bonded by vulcanization to the inner circumference of the cylindrical metal fitting 24. As shown in FIG. 2, an elastic body 30 is bonded by vulcanization to a portion of the groove 26.

As shown in FIG. 1, a disk-shaped metal fitting 32 is embedded in the upper central portion of the vibration absorbing main body 28. A mounting bolt 34 is stood upright at the center of the metal fitting 32 so as to protrude from the vibration absorbing main body 28. The engine of an unillustrated automobile is disposed on the upper surface of the vibration absorbing main body 28, and the engine is fixed to the vehicle body by screwing the mounting bolt 34 to a nut.

As shown in FIGS. 1 and 2, an elongated groove 36 is formed at the elastic body 30 which is disposed in the groove 26. As shown in FIG. 2, the longitudinal direction intermediate portion of the elongated groove 36 is folded over. One end of the elongated groove 36 opens at the longitudinal direction at one end of the elastic body 30, and the other end of the elongated groove 36 terminates in the vicinity of the longitudinal direction at the other end of the elastic body 30. As shown in FIG. 1, the elongated groove 36 is surrounded by the second intermediate cylinder 20 so as to form a restricting passage 37.

In the second intermediate cylinder 20, a rectangular opening 38 is formed at a position which opposes a concave portion, of the groove 26 in the rubber molded product 22, to which the elastic body 30 is not bonded by vulcanization. A diaphragm 40, which protrudes toward the rubber molded product 22 so as to close the opening 38, is bonded by vulcanization to the second intermediate cylinder 20. An auxiliary liquid chamber 44 is formed between the diaphragm 40 and the concave portion of the rubber molded product 22 to which the elastic body 30 is not bonded by vulcanization, and one end of the restricting passage 37 is connected to the auxiliary liquid chamber 44.

An electromagnet 46, an annular spacer 48, and a partitioning wall member 50 are inserted into the first intermediate cylinder 18.

The electromagnet 46 includes a coil 46A and a core 46B formed of iron. The coil 46A is filled with a resin 46C. Further, a disk-shaped permanent magnet 46D is embedded on the upper central surface of the core 46B so that the upper surface of the permanent magnet 46D is flush with the upper surface of the core 46B.

As shown in FIG. 1, a pressure-receiving liquid chamber 52 is formed at a space between the partitioning wall member 50 and the elastic body 30. The pressure-receiving liquid chamber 52 is connected to the other end of the restricting passage 37 via a hole 53 formed at the rubber molded product 22.

The partitioning wall member 50 includes an annular metal fitting 54 and a movable disk 56 which is coaxially disposed at the center of the annular metal fitting 54. The annular metal fitting 54 and the movable disk 56 are integrally connected by an annular rubber film 58. The rubber film 58 is bonded by vulcanization to the annular metal fitting 54 and the movable disk 56, and the length (L) between the annular metal fitting 54 and the movable disk 56 is sufficiently longer than the thickness (t) therebetween.

The outer peripheral portion of a plate spring 60 is nipped between the partitioning wall member 50 and the spacer 48. FIG. 3 shows the plate spring 60 at which fan-shaped holes 60A and a round hole 60B are punched. A small gap (not shown) is formed between the partitioning wall member 50 and the plate spring 60 and between the spacer 48 and the plate spring 60. Three plate springs 60 are used, however, the number of the plate spring 60 is not limited to three.

As shown in FIG. 1, a restricting plate 57 is mounted to the movable disk 56 on the surface which opposes the pressure-receiving liquid chamber 52. The restricting plate 57 opposes the rubber film 58 so that the restricting plate 57 is able to contact the rubber film 58 on the surface which opposes the pressure-receiving liquid chamber 52. The rubber film 58 is thereby prevented from swelling and deforming outwardly to the pressure-receiving liquid chamber 52 side. Further, the plate spring 60 opposes the rubber film 58 so that the plate spring 60 is able to contact the rubber film 58 on the surface at the side opposite the pressure-receiving liquid chamber 52. The rubber film 58 is thereby prevented from swelling and deforming outwardly to the electromagnet 46 side. In this way, the restricting plate 57 and the plate spring 60 are opposingly provided so as to be close to and hold the rubber film 58.

A boss 56A formed on the movable disk 56 is inserted through a round hole 60B of the plate spring 60, and a male screw 66 which protrudes from a suction plate 64 disposed beneath the plate spring 60 screws to a female screw 62 formed at the center of the movable disk 56. The suction plate 64 is formed in the disk shape and of an iron so that the suction plate 64 is sucked by magnetic force.

A vicinity of the inner periphery of the plate spring 60 is nipped between the movable disk 56 and a boss 64A of the suction plate 64 with a small gap (not shown) therebetween. Namely, the inner peripheral end and the outer peripheral end of the plate spring 60 are free ends.

A thin portion of the suction plate 64 which extends outwardly from the boss 64A is spaced apart from the electromagnet 46 and the plate spring 60 by predetermined lengths. Further, a predetermined amount of suction force is applied to the suction plate 64 by the permanent magnet 46D.

Further, liquid such as silicon oil, ethylene glycol, and the like is filled in the restricting passage 37, the auxiliary liquid chamber 44, and the pressure-receiving liquid chamber 52.

The electromagnet 46 and the suction plate 64 function as actuators for driving the movable disk 56.

Next, the operation of the vibration isolating apparatus will be explained.

When the vertical vibration of an engine is input to the vibration isolating apparatus 10, the vibration absorbing main body 28 is elastically deformed and the pressure-receiving liquid chamber 52 expands and contracts. In this way, the liquid moves reciprocally in the restricting passage 37. When the liquid resonates in the restricting passage 37, dynamic spring constant is reduced and vibration is effectively absorbed.

When the frequency of the vibration is increased, the restricting passage 37 is clogged. In this case, the suction plate 64 and the movable disk 56 are vibrated by the electromagnet 46 so that the internal pressure of the pressure-receiving liquid chamber 52 is not increased. In this way, vibrations of high frequencies can be absorbed effectively. Thus, vibrations of a wide range of frequencies from low frequency vibrations to high frequency vibrations can be absorbed. As the suction plate 64 and the movable disk 56 are vibrated by the electromagnet 46 so as to control the internal pressure, the characteristic of the vibration isolating apparatus 10 can be changed easily.

Instead of fixing the inner and outer ends of the plate spring 60, the plate spring 60 is held via a small gap so that stress is not concentrated threon at the time of elastic deformation. Accordingly, the durability of the plate spring 60 can be improved.

The plate spring 60 supports the suction plate 64 and the movable disk 56, and the rubber film 58 only serves as a seal in which the liquid is prevented from being leaked to the electromagnet 46 side. Accordingly, the distortion of the rubber can be reduced by increasing the portion of the rubber film 58 which can be deformed freely, and the durability of the rubber can be improved. For example, compared to a conventional type in which the movable plate is supported by the rubber, the distortion of the rubber can be cut down by 20 to 30%.

Moreover, when the rubber film 58 is deformed by liquid pressure, the effect of control due to the vibration of the suction plate 64 and the use of variations in internal pressure does not come out. However, the swelling and deformation of the rubber film 58 is prevented by the plate spring 60 and the restricting plate 57 such that the effect of control can be achieved.

The restricting plate 57 is disposed on the rubber film 58 at the pressure-receiving liquid chamber 52 side and the plate spring 60 is disposed at the electromagnet 46 side. However, the invention is not limited to the same. Even if the restricting plate 57 is disposed at the electromagnet 46 side and the plate spring 60 is disposed at the pressure-receiving liquid chamber 52 side, the swelling and deformation of the rubber film 58 is prevented in the same way and the effect of control can be achieved.

Furthermore, it is possible that the plate spring 60 is disposed at the electromagnet 46 side, another plate spring 60 supported in the same manner is used instead of the restricting plate 57, and the rubber film 58 is nipped by the two plate springs 60.

What is claimed is:

1. A vibration isolating apparatus, comprising:
    an elastic body which is connected to one of a vibration generating portion and a vibration receiving portion and which is elastically deformed when vibration is inputted;
    a liquid chamber forming member which forms a liquid chamber with said elastic body;
    a movable plate which forms a portion of a partitioning wall of the liquid chamber and which controls the pressure of the liquid chamber;
    an actuator which drives said movable plate;
    an elastic film which is disposed between said movable plate and said liquid chamber forming member so as to seal the liquid chamber;
    a plate spring which is disposed on said elastic film at one of the liquid chamber side and the side opposite the liquid chamber side and which elastically supports said movable plate with respect to said liquid chamber forming member, said plate spring opposing said elastic film so that said plate spring is able to contact said elastic film;
    restricting means which is disposed on an outer surface of said elastic film at the side opposite the side at which said plate spring is provided, wherein the elastic film is disposed between and in contact with the plate spring and the restricting means; and
    wherein swelling and deformation of said elastic film at the liquid chamber side and at the side opposite the liquid chamber side is prevented by said plate spring and said restricting means.

2. A vibration isolating apparatus according to claim 1, wherein said plate spring is supported as the ends of said plate spring are free ends.

3. A vibration isolating apparatus according to claim 1, wherein said restricting means and said plate spring are provided so as to be close to and hold said elastic film, and said restricting means and said plate spring are provided so as to oppose to each other.

4. A vibration isolating apparatus according to claim 1, wherein said restricting means is disposed at said movable plate, and said restricting means is provided at said elastic film so that said restricting means is able to contact said elastic film.

5. A vibration isolating apparatus according to claim 4, wherein said restricting means is a plate member.

6. A vibration isolating apparatus according to claim 1, wherein said actuator has an electromagnet and a suction plate which is provided so as to be able to be sucked by magnetic force of said electromagnet, and said suction plate is mounted to said movable plate.

7. A vibration isolating apparatus according to claim 1, wherein said liquid chamber forming member has a cylindrical member.

8. A vibration isolating apparatus according to claim 7, wherein said cylindrical member has a restricting passage at the outer periphery.

9. A vibration isolating apparatus, comprising:
    an elastic body which is connected to one of a vibration generating portion and a vibration receiving portion and which is elastically deformed when vibration is inputted;
    a liquid chamber forming member which forms a liquid chamber with said elastic body;
    a movable plate which forms a portion of a partitioning wall of the liquid chamber and which controls the pressure of the liquid chamber;
    an actuator which drives said movable plate;
    an elastic film which is disposed between said movable plate and said liquid chamber forming member so as to seal the liquid chamber;
    a plate spring which is disposed on said elastic film at one of the liquid chamber side and the side opposite the liquid chamber side and which elastically supports said movable plate with respect to said liquid chamber forming member, said plate spring opposing said elastic film so that said plate spring is able to contact said elastic film;
    restricting means which is disposed on an outer surface of said elastic film at the side opposite the side at which said plate spring is provided, wherein the elastic film is disposed between and in contact with the plate spring and the restricting means; and
    wherein swelling and deformation of said elastic film at the liquid chamber side and at the side opposite the liquid chamber side is prevented by said plate spring and said restricting means, and said restricting means and said plate spring are provided so as to be close to and hold said elastic film, and said restricting means and said plate spring are provided so as to oppose to each other.

10. A vibration isolating apparatus according to claim 9, wherein said plate spring is supported as the ends of said plate spring are free ends.

11. A vibration isolating apparatus according to claim 9, wherein said restricting means is disposed at said movable plate, and said restricting means is provided at said elastic film so that said restricting means is able to contact said elastic film.

12. A vibration isolating apparatus according to claim 11, wherein said restricting means is a plate member.

13. A vibration isolating apparatus according to claim 9, wherein said actuator has an electromagnet and a suction plate which is provided so as to be able to be sucked by magnetic force of said electromagnet, and said suction plate is mounted to said movable plate.

14. A vibration isolating apparatus according to claim 9, wherein said liquid chamber forming member has a cylindrical member.

15. A vibration isolating apparatus according to claim 14, wherein said cylindrical member has a restricting passage at the outer periphery.

16. A vibration isolating apparatus, comprising:

an elastic body which is connected to one of a vibration generating portion and a vibration receiving portion and which is elastically deformed when vibration is inputted;

a liquid chamber forming member which forms a liquid chamber with said elastic body;

a movable plate which forms a portion of a partitioning wall of the liquid chamber and which controls the pressure of the liquid chamber;

an actuator which drives said movable plate;

an elastic film which is disposed between said movable plate and said liquid chamber forming member so as to seal the liquid chamber;

a plate spring which is disposed on said elastic film at one of the liquid chamber side and the side opposite the liquid chamber side and which elastically supports said movable plate with respect to said liquid chamber forming member, said plate spring opposing said elastic film so that said plate spring is able to contact said elastic film;

a restricting plate which is disposed on an outer surface of said elastic film at the side opposite the side at which said plate spring is provided, said restricting plate being disposed at said movable plate, and said restricting plate being provided at said elastic film so that said restricting plate is able to contact said elastic film, wherein the elastic film is disposed between and in contact with the plate spring and the restricting plate; and wherein swelling and deformation of said elastic film at the liquid chamber side and at the side opposite the liquid chamber side is prevented by said plate spring and said restricting plate, and said restricting plate and said plate spring are provided so as to be close to and hold said elastic film, and said restricting plate and said plate spring are provided so at to oppose to each other.

17. A vibration isolating apparatus according to claim 16, wherein said plate spring is supported as the ends of said plate spring are free ends.

18. A vibration isolating apparatus according to claim 16, wherein said actuator has an electromagnet and a suction plate which is provided so as to be able to be sucked by magnetic force of said electromagnet, and said suction plate is mounted to said movable plate.

19. A vibration isolating apparatus according to claim 16, wherein said liquid chamber forming member has a cylindrical member.

20. A vibration isolating apparatus according to claim 19, wherein said cylindrical member has a restricting passage at the outer periphery.

* * * * *